United States Patent
Kunze et al.

(10) Patent No.: US 12,499,594 B2
(45) Date of Patent: Dec. 16, 2025

(54) PROSPECTIVE SLICE TRACKING THROUGH INTERLEAVED PERPENDICULAR ACQUISITIONS OF DYNAMIC 2D CARDIOVASCULAR MRI

(71) Applicant: Siemens Healthineers AG, Forchheim (DE)

(72) Inventors: Karl-Philipp Kunze, London (GB); Radhouene Neji, London (GB)

(73) Assignee: SIEMENS HEALTHINEERS AG, Forchheim (DE)

( * ) Notice: Subject to any disclaimer, the term of this patent is extended or adjusted under 35 U.S.C. 154(b) by 246 days.

(21) Appl. No.: 18/329,655

(22) Filed: Jun. 6, 2023

(65) Prior Publication Data
US 2023/0401767 A1    Dec. 14, 2023

(30) Foreign Application Priority Data
Jun. 8, 2022  (EP) .................................. 22177768

(51) Int. Cl.
G06T 11/00    (2006.01)
G06T 3/4053   (2024.01)
G06T 7/00     (2017.01)

(52) U.S. Cl.
CPC .......... *G06T 11/005* (2013.01); *G06T 3/4053* (2013.01); *G06T 7/0016* (2013.01); *G06T 2207/10088* (2013.01); *G06T 2207/30048* (2013.01)

(58) Field of Classification Search
CPC ... G06T 11/005; G06T 3/4053; G06T 7/0016; G06T 2207/10088; G06T 2207/30048; G01R 33/4835; G01R 33/56366; G01R 33/543; G01R 33/56308; G01R 33/56509; G01R 33/5601
See application file for complete search history.

(56) References Cited

U.S. PATENT DOCUMENTS

| 11,860,257 B2 * | 1/2024 | Polak | G01R 33/5611 |
| 2013/0035588 A1 | 2/2013 | Shea | |
| 2016/0139225 A1 * | 5/2016 | Basha | G01R 33/4835 324/309 |

(Continued)

FOREIGN PATENT DOCUMENTS

| JP | H11318849 A | 11/1999 |
| JP | 2015144738 A | 8/2015 |
| WO | WO 2006068149 A1 | 6/2006 |

OTHER PUBLICATIONS

Wan et al , Correcting motion in multiplanar cardiac magnetic resonance images, Wan et al. BioMed Eng OnLine (2016) 15:93 (Year: 2016).*

(Continued)

*Primary Examiner* — Andrae S Allison
(74) *Attorney, Agent, or Firm* — Harness, Dickey & Pierce, P.L.C.

(57) ABSTRACT

One or more example embodiments of the present invention relates to a method for generating MR images of the heart, the method comprising acquiring and reconstructing a first set of 2D reference images of the heart during a reference heartbeat, the first set comprising a first reference image acquired along a first reference plane position thorough the heart and acquiring a second set of 2D images of the heart during a second heartbeat.

15 Claims, 4 Drawing Sheets

(56) References Cited

U.S. PATENT DOCUMENTS

| | | | |
|---|---|---|---|
| 2017/0061588 A1* | 3/2017 | Lee | G06T 7/248 |
| 2018/0140216 A1* | 5/2018 | Li | A61B 5/02 |
| 2019/0154785 A1* | 5/2019 | Zhou | G01R 33/56316 |
| 2021/0373105 A1* | 12/2021 | Polak | G01R 33/56509 |
| 2022/0065971 A1* | 3/2022 | Polak | G01R 33/5608 |
| 2022/0309652 A1* | 9/2022 | Hong | G06T 11/008 |

OTHER PUBLICATIONS

Moghari et al, Free-breathing Whole-heart 3D Cine Magnetic Resonance Imaging with Prospective Respiratory Motion Compensation, Magn Reson Med. Jul. 2018 ; 80(1): 181-189. doi:10.1002/mrm.27021. (Year: 2018).*

European Communication under Rule 71(3) for European Application No. 22177768.3 mailed May 14, 2025.

Extended European Search Report for European Application No. 22177768.3 mailed Nov. 30, 2022.

White N. et al.: "PROMO: Real-Time Prospective Motion Correction in MRI Using Image-Based Tracking"; Magnetic Resonance in Medicine; John Wiley & Sons; Inc. US; vol. 63; No. 1; pp. 91-105; XP007916079; ISSN: 0740-3194; 2010.

Pedersen H. et al.:"Quantification of myocardial perfusion using free-breathing MRI and prospective slice tracking". Magn. Reson. Med., 61: 734-738. https://doi.org/10.1002/mrm.21880.

Kozerke S, Scheidegger MB, Pedersen EM, Boesiger P. Heart Motion Adapted Cine Phase-Contrast Flow Measurements through the Aortic Valve MRM vol. 42, pp. 970-978, 1999; XP002372021; 1999.

Mooiweer R. et al.:"A fast navigator (fastNAV) for prospective respiratory motion correction in first-pass myocardial perfusion imaging". Magn Reson Med. 2021; 85: 2661-2671. https://doi.org/10.1002/mrm.28617.

Ludwig Juliane et al: "Pilot tone-based motion correction for prospective respiratory compensated cardiac eine MRI", Magnetic Resonance in Medicine, vol. 85, No. 5, Nov. 23, 2020 (Nov. 23, 2020), pp. 2403-2416, XP093001018, US ISSN: 0740-3194, DOI: 10.1002/mrm.28580; Retrieved from the Internet: URL:https://onlinelibrary.wiley.com/doi/full-XML/10.1002/mrm.28580; 2020.

Bush M. et al,;"Patient specific prospective respiratory motion correction for efficient, free-breathing cardiovascular MRI" Magn Reson Med. 2019; 81: 3662-3674. https://doi.org/10.1002/mrm.27681.

Basha Tamer A. et al: "Free-breathing cardiac MR stress perfusion with real-time slice tracking : Navigator Slice-Tracking in Stress-Perfusion MRI", Magnetic Resonance in Medicine, vol. 72, No. 3, Oct. 7, 2013 (Oct. 7, 2013), pp. 689-698, XP093001021, US ISSN: 0740-3194, DOI: 10.1002/mrm.24977; 2013.

Thesen S et al: "Prospective Acquisition Correction for Head Motion With Image-Basedtracking for Real-Time Fmri", Magnetic Resonance in Medicine, John Wiley & Sons, Inc, vol. 44, No. 3, pp. 457-465, XP000951988, ISSN: 0740-3194, DOI: 10.1002/1522-2594(200009)44:3 457: :AIDMRM173.0.C0;2-R; 2000.

T. Carteret, M. Merle, G. Maclair, B. Denis De Senneville, C. Moonen, B. Quesson: "A rapid and robust method for reducing out-otplane motion in dynamic imaging. Application to MRI thermometry onabdominal organs", International Society for Magnetic Resonance in Medicine, Apr. 3, 2009 (Apr. 3, 2009), p. 2536, XP040609768; 2009.

* cited by examiner

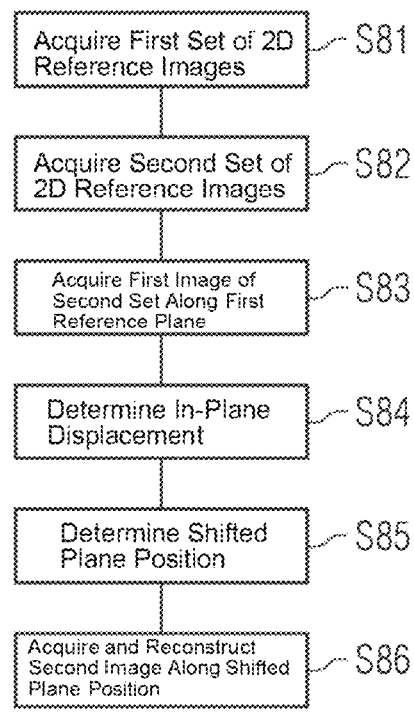

PROSPECTIVE SLICE TRACKING THROUGH INTERLEAVED PERPENDICULAR ACQUISITIONS OF DYNAMIC 2D CARDIOVASCULAR MRI

CROSS-REFERENCE TO RELATED APPLICATION(S)

The present application claims priority under 35 U.S.C. § 119 to European Patent Application No. 22177768.3, filed Jun. 8, 2022, the entire contents of which are incorporated herein by reference.

FIELD

The present application relates to a method for generating MR images of the heart, to the corresponding MR imaging system, a computer program comprising program code and last but not least a carrier comprising the computer program.

RELATED ART

Dynamic 2D cardiovascular MRI (Magnetic Resonance Imaging) is challenged by respiratory motion between acquisitions of the dynamic time series. For any 2D MR imaging, the impact of respiratory motion can be sorted into two categories: 1) as motion of the heart between dynamics within the imaged 2D plane (in-plane), and 2) as motion of the heart in- and out of the imaged 2D plane between acquisitions (through-plane). The impact and visibility of in-plane and through-plane motion may vary with anatomy and prescribed slice position, but both are usually significant for the standard slice orientations used in cardiovascular MRI (particularly short-axis). Additionally, significant motion of both sorts may appear intermittently, i.e. irregularly and unpredictably, during deep breathing.

While in-plane motion can be corrected for retrospectively by image-based motion correction, the problem of through-plane motion is that the acquisition itself does not contain the moving parts anymore, making retrospective image-based motion correction impossible, and requiring some form of prospective correction (e.g. slice tracking). Through-plane motion is especially detrimental for perfusion quantification which typically involves a long dynamic data window for the same location within the heart.

Prospective motion correction is often achieved using a separate navigator acquisition before every individual acquisition. Information from this navigator can be used to reject data outside an acceptance window and/or shift the slice position of the following acquisition according to the motion indicated by the navigator.

For segmented 3D cardiovascular imaging this can be a 1D cone/pencil-beam navigator on the diaphragm, to estimate motion along different directions and inform (i.e. shift) the subsequent image acquisition prospectively or correct the data retrospectively.

SUMMARY

For dynamic 2D imaging, prospective slice tracking with 1D diaphragmatic navigators is possible but several problems remain:

1) The assumption of a fixed tracking factor between diaphragmatic and myocardial motion, or the necessity for a potentially imprecise learning phase, that doesn't cover intermittent or singular deep-breathing events.

2) A complex interaction between 1D navigators and inversion- or saturation-preparation pulses usually employed in dynamic imaging, necessitating the use of additional restore pulses potentially affecting the actual diagnostic image acquisition.

3) The application of diaphragmatic feat-head motion to a myocardial short axis slice, the orientation of which depends on individual anatomy, where feat-head is not necessarily the only contribution to through-plane motion.

Accordingly, a need exists to overcome the above-mentioned problems and to provide a method for MR imaging of the heart in which the occurring through-plane motion can be overcome in an effective way.

This need is met by the features of the independent claims. Further aspects are described in the dependent claims.

BRIEF DESCRIPTION OF THE DRAWINGS

The foregoing and additional features and effects of the application will become apparent from the following detailed description, when read in conjunction with the accompanying drawings in which like reference numerals refer to like elements.

FIG. 5 shows a schematic view of a flowchart comprising some of the steps needed to determine MR-images of the heart while avoiding through plane motion artifacts according to one or more example embodiments.

DETAILED DESCRIPTION

Figure 1:
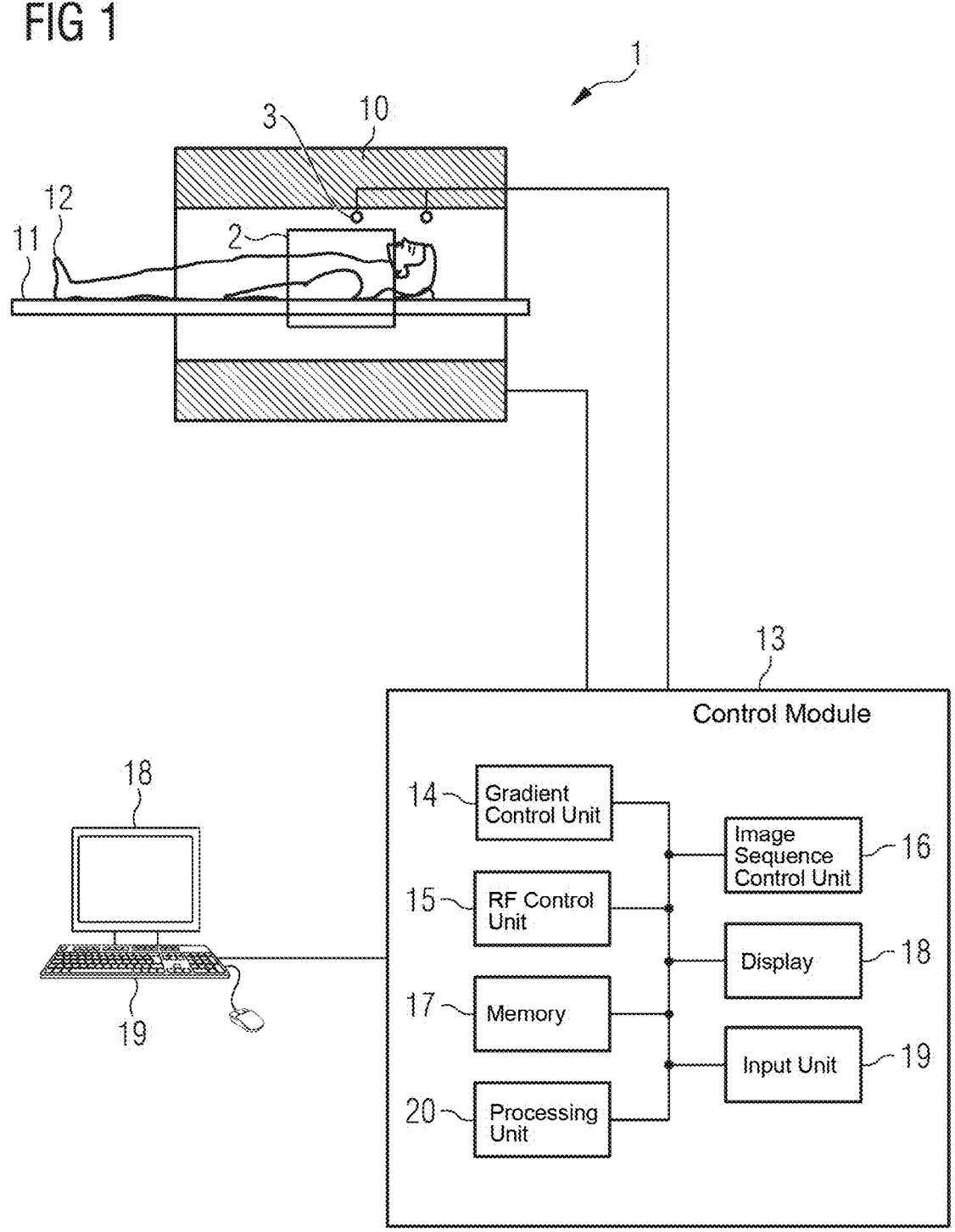
FIG. 1 shows a schematic view of an MR system with which MR images of the heart can be generated with an optimized correction of the through plane movement occurring in MR imaging of the heart according to one or more example embodiments.

According to one or more example embodiments, a method for generating MR images of the heart is provided wherein the method comprises the step of acquiring and reconstructing a first set of 2D reference images of the heart during a reference heartbeat, wherein the first set comprises a first reference image acquired along a first reference plane position through the heart. Furthermore, a second set of 2D images of the heart is acquired during a second heartbeat wherein this acquisition of the second set comprises the step of acquiring a first image in the second set acquired along the first reference plane. Based on the first reference image and the first image in the second set, a first in-plane displacement is determined for the heart in the image plane of the first reference plane position. Then, a shifted plane position is determined for a second image in the second set to be acquired perpendicular to first image in the second set based on the determined first in-plane displacement which was determined from the first reference image and the first image of the second set. Furthermore, a second image along the shifted plane position is acquired and reconstructed, wherein all images of the first set of 2D images and all images of the second set of 2D images are diagnostically relevant images.

As the second image in the second set is perpendicular to the first image in each of the sets, it is possible to determine the through-plane motion in the first images of each set where it is an in-plane motion wherein it is through-plane motion for the corresponding second images of each set as the image planes are perpendicular. Before the second image in the second set during the second heartbeat is determined, the in-plane displacement can be determined using any kind of matching algorithm in which the first reference image or any anatomical landmark in this image is compared to the first image in the second set which is acquired along the same plane position. For the perpendicular orientation this corresponds to the through-plane movement for the image orientation of the second images so that this displacement can be considered when positioning the second or shifted plane position for the second image in the second set.

Preferably, the second set comprises N images wherein for the additional images 2 to N in the second set the plane position for each of the additional images is parallel to one another and perpendicular to the first reference plane position. Here the plane position for each of the additional images may be determined based on this first in-plane displacement. The additional images in the second set are all parallel planes through the heart such as short axis views of the heart at different positions through the heart. For all these images the in-plane displacement determined from the corresponding first images helps to set and adapt the image planes in the second heartbeat so that substantially the same anatomical region is shown in the image compared to the first set of images.

In another embodiment it is possible to acquire and reconstruct the first set in such a way that it comprises acquisition and reconstructing N reference images during the reference heartbeat, wherein the second set of images also comprises N images. For both sets it is possible that the image plane position of image n is perpendicular to the image plane position of image n+1 in both sets and n being an integer between 1 and N−1 wherein the shifted plane position is determined for the image n+1 in the second set based on the corresponding in-plane displacement determined with image n in the first set and image n in the second set. Here, each image of the second set in the second heartbeat can be corrected based on the preceding images in the present and previous heartbeat. This becomes possible as each consecutive image has an image plane perpendicular to the directly preceding image. Accordingly, if the first image plane is a short-axis view, the following image plane is a long axis view or vice versa.

Here it is possible that every second image in the first set and every second image in a second set have plane positions along the same image plane such as a long axis of the heart or along a short axis of the heart, wherein the intermediate images have a perpendicular image plane.

Furthermore, it is possible that the images in each of the first and second set having an odd image number represent images of the heart along the long axis of the heart wherein the images in each of the first and second set having an even image number represent images of the heart along a short axis of the heart. In the same way, the images having an odd image number could be short axis views and the images having an even image number could be long axis views.

Preferably the second image in the second set and the further reference image substantially have the same anatomical position within the heart. This becomes possible as the in-plane motion determined from the corresponding first images helps to obtain the image-plane position and through plane motion for the second image in the perpendicular plane.

Furthermore, the method can comprise the step of reconstructing final versions of each of the images acquired in the first and second set wherein the final versions each have a higher resolution compared to the first image and the first reference image which were used to determine the in-plane displacement. As the reconstruction of the first images in each set and the determination of the in-plane displacement have to occur within the second heartbeat so that the second image can be acquired in the second set of images, a fast imaging sequence and a reconstruction is necessary. By way of example an imaging sequence can be used in which the MR signals used for reconstructing each of the images are acquired after a single excitation RF pulse. Accordingly, the imaging sequence can be a single shot imaging sequence and maybe preferably a gradient echo based imaging sequence.

Furthermore, a matching procedure can be used for the first reference image and the first image in which at least a subset of the first reference image is compared to at least a subset of the first image to determine the in-plane displacement in these 2 images which corresponds to the through-plane displacement for the following image.

The step of acquiring a second set of 2D images during a second heartbeat and all successive steps can be repeated for any number of successive heartbeats. Furthermore it is possible that method is applied with the steps during an administration of an MR contrast agent and the acquired images of the first and second set represent inflow of the MR contrast agent into the heart.

Furthermore, the corresponding MR Imaging System is provided which is configured to generate the MR images of the heart wherein the imaging system comprises a control unit which can operate as discussed above or as discussed in further detail below.

Furthermore, a computer program comprising program code is provided which when executed by a control unit of the MR Imaging System causes the MR Imaging System to carry out a method as discussed above or as discussed in further detail below.

Additionally, a carrier comprising the computer program is provided wherein the carrier is one of an electronic signal, optical signal, radio signal, and computer readable storage medium.

In the following, embodiments of the invention will be described in detail with reference to the accompanying drawings. It is to be understood the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may be implemented by an indirect connection or coupling. A coupling between components may be established over a wired or wireless connection. Functional blocks may be implemented in hardware, software, firmware, or a combination thereof.

FIG. 1 shows a schematic view of an MR system 1, which compromises a magnet 10 generating a polarization field BO. An object under examination 12 lying on a table 11 is moved into the center of the MR system 1 where MR signals after RF excitation can be detected by receiving coils 2 which can comprise different coil sections wherein each coil section is associated with a corresponding detection channel 3. By applying RF pulses and magnetic field gradients, the nuclear spins in the object 12 and especially in the part located in the receiving coil 2, here the heart are exited and location coded and the currents induced by the relaxation can be detected. The way how MR images are generated and how the MR signals are detected using a sequence of RF pulses and the sequence of magnetic field gradients are known in the art so that a detailed explanation thereof is omitted.

The MR system comprises a control module 13 which is used for controlling the MR system. The control module 13 comprises a gradient control unit 14 for controlling and switching the magnetic field gradients, an RF control unit 15 for controlling and generating the RF pulses for the imaging sequences. An image sequence control unit 16 is provided which controls the sequence of the applied RF pulses and magnetic field gradients and thus controls the gradient control unit 14 and the RF control unit 15. In a memory 17, computer programs needed for operating the MR system and the imaging sequences necessary for generating the MR images can be stored together with the generated MR images. The generated MR images can be displayed on a display 18 wherein an input unit 19 is provided used by a user of the MR system to control the functioning of the MR system. A processing unit 20 can coordinate the operation of the different functional units shown in FIG. 1 and can comprise one or more processors which can carry out instructions stored on the memory 17. The memory includes the program code to be executed by the processing unit 19. The processing unit can, based on the detected images reconstruct an MR images.

As will be discussed below a method will be explained making it possible to consider the through plane motion in such a way that the same image plane relative to the heart can be acquired even when a motion is occurring. Especially the control module 13 can be configured to operate as discussed below.

Instead of running dynamic 2D image scans of parallel planes of the same orientation and adjacent to each other in time it is proposed to interleave the acquisition of an orientation of interest such as a short axis view with acquisitions of diagnostically relevant image orientations that are perpendicular to this orientation of interest.

Figure 2:
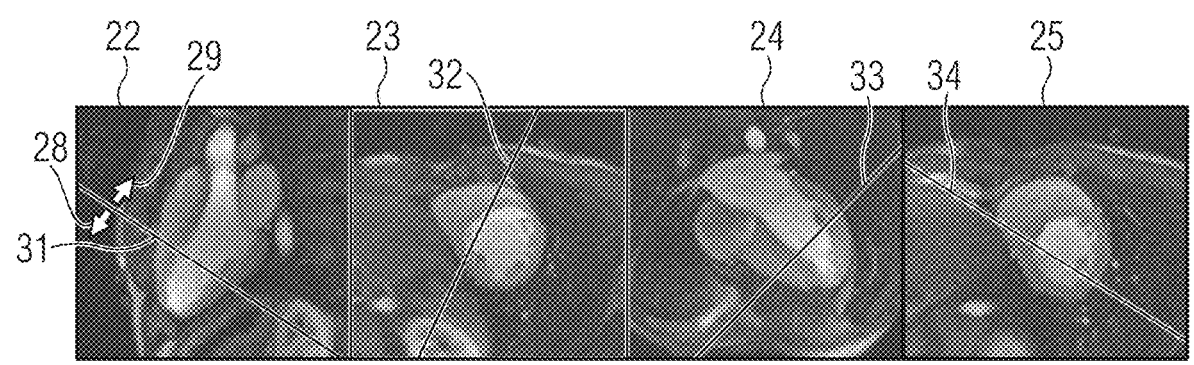
FIG. 2 shows a schematic view of a method how successive image plane positions are determined as being perpendicular to the preceding image plane during the same heartbeat according to one or more example embodiments.

FIG. 2 shows a schematic view for a succession of perpendicular perfusion slices. By way of example the first image of the image set, image 22 can be a two or three chamber along a long axis, i.e. a long axis view, followed by image 23 which shows a short axis view followed by an image 24 with a long axis slice position with a four chamber view and a short axis image 25 which are acquired adjacent to one another in one time window during the same heartbeat. In each of the images the plane location for the following image is shown meaning that in image 22 the plane location is represented by line 31 which then shows the image plane for image 23. In the same way in image 23 the plane location 32 is shown indicating the plane position for the third image 24. In image 24 the plane position 33 is shown and in image 25 the plane position 34 which could be a similar plane has shown in image 22 which might be acquired in the next heartbeat.

With such a procedure a prospective slice correction for the slice positions can be obtained for a following heartbeat by reconstructing a following perpendicularly oriented image, by registering it to some arbitrary reference of the same orientation of an earlier heartbeat and by applying the so obtained shift prospectively to the next perpendicular acquisition as will be explained in more detail below in connection with FIG. 4. In FIG. 2, in the first image the two arrows 28 or 29 represent the projection of the motion perpendicular to the following short axis slice, the image plane 31, which is used to adjust the slice position of image 23 to the chosen reference. In this way, the short axis view displayed in image 23 is acquired at the same anatomical position through the whole examination and all remaining in-plane motion can be corrected retrospectively. While the time between successive slice acquisitions is short, the time for a preliminary and low-resolution reconstruction of the previous slice and a matching to its reference to adjust the following slice position is enabled by the usually employed saturation-recovery (SR) preparation, leaving a time before the beginning of the next data acquisition of about 50 ms or more. Perpendicular orientations may be applied in several different ways.

Figure 3:
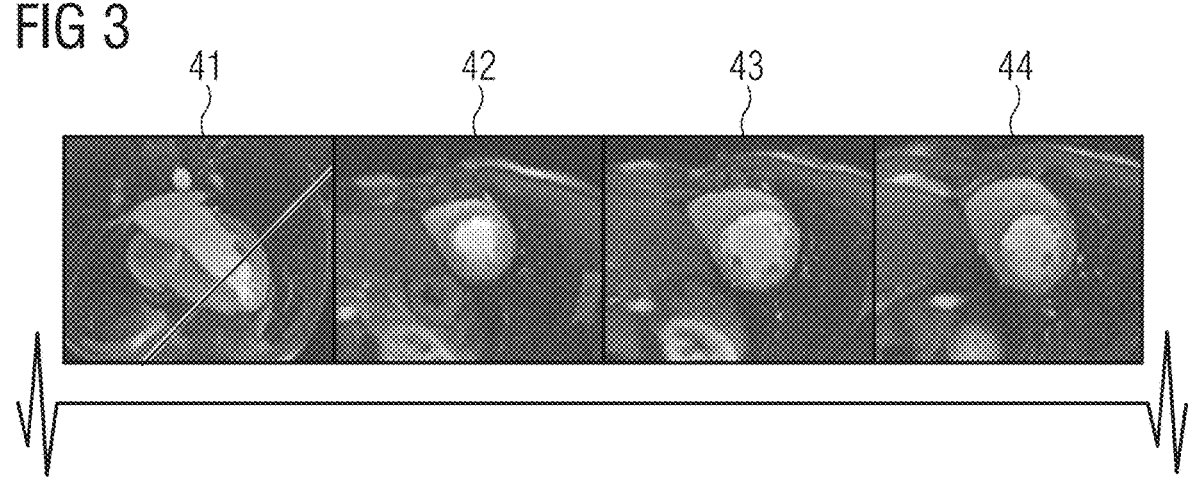
FIG. 3 shows a first schematic view of three short axis image acquisitions after one long axis image acquisition according to one or more example embodiments.
Figure 4:
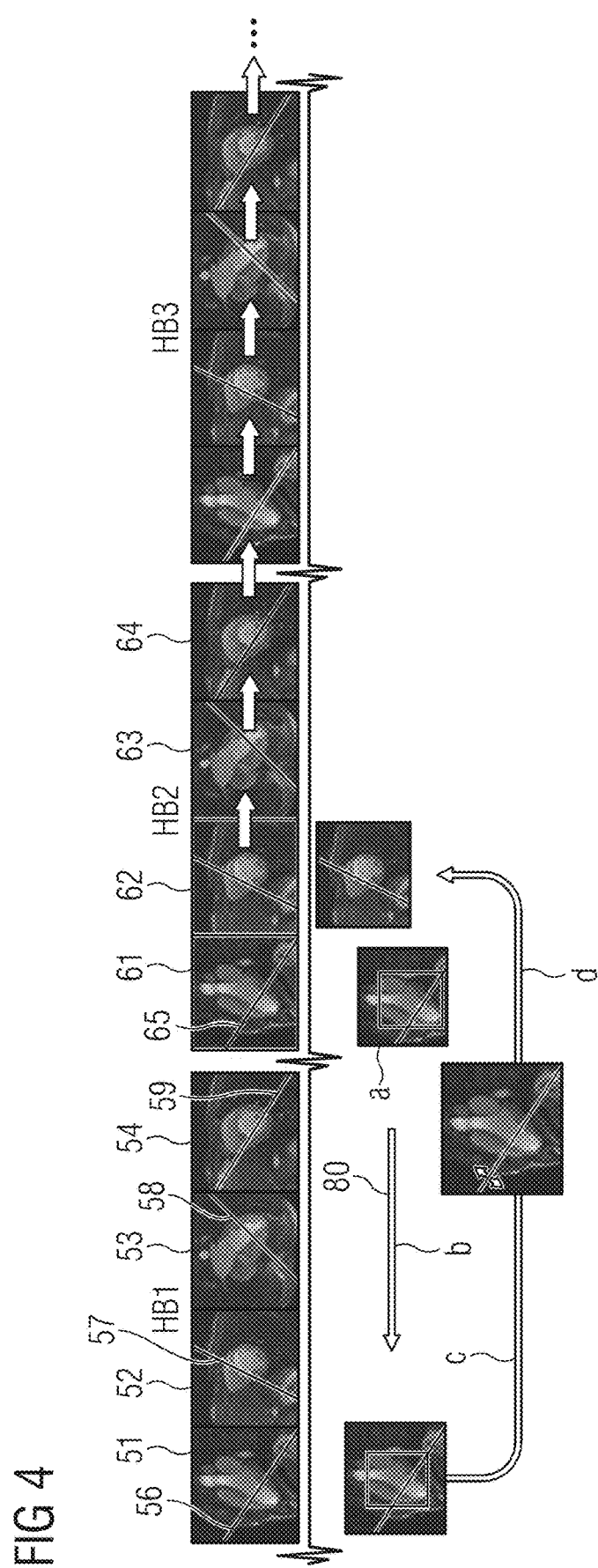
FIG. 4 shows a schematic view of how images of different heartbeats are acquired and processed in order to have the through-plane motion considered according to one or more example embodiments.

A first example is shown in FIG. 3 whereas another example is shown in FIG. 4. In both examples N 2D slice images per heartbeat are acquired in a dynamic perfusion experiment wherein FIG. 3 shows a first image 41 which is a long axis view such as a two chamber, or a three chamber or a four chamber view followed by N−1 short axis slices which are prospectively shifted according to the same, first long axis slice in each heartbeat. This means that before images 42 to 44 are acquired, image 41 is compared to the same image taken at an earlier heartbeat and based on the comparison of these two images and in-plane motion can be determined for this image plane position. As the next plane shown by line 47 is perpendicular, the slice position can be adapted correspondingly.

FIG. 4 shows a kind of flowchart explaining how the different images are acquired and how the post-processing may be carried out. In the first heartbeat, the images 51 to 54 are acquired, wherein the image slice positions 56 to 59 are such that subsequent image slices are perpendicular to one another. In the example shown image 51 is a long axis view, image 52 a short axis view, image 53 a long axis view and image 54 a short axis view. This means that perpendicular positions are acquired in an interleaved way. After this first step, in a second step, the images are also reconstructed for the first heartbeat at the original positions as reference images. The Images 51 to 54 in the first image set play the role of a reference image set.

In a third step, for all remaining heartbeats the same slice positions in the same order as in the reference image set is used and in a first part of this third step, in step 3a), image 61 is acquired at a slice position which is potentially shifted relative to the previous acquisition in the previous heartbeat in view of a respiratory motion of the patient and reconstructed preferably with a low resolution. Before the following images 62 to 64 are acquired, image 61 is matched with image 51 as shown by arrow 80 in step 3b. This matching can be based on the complete images 51 and 61 or in a subset of the images. In a next step 3c, an in-plane motion displacement is calculated which corresponds to the through-plane motion for the following slice position and in step 3d the following slice position, namely the plane position 65 used for the generation of image 62 is shifted to match the reference position of steps 3b and 3c. The same steps 3a) to 3d) mentioned above can be applied to the following image meaning that image 62 is compared to image 52 to determine an in-plane motion shown in these images which corresponds to the through-plane motion for image 63 so that the image plane position is adapted before image 63 is acquired. Accordingly, for each arrow shown in FIG. 4 between images 62 and 64 steps a) to d) can be repeated. The same procedure can be applied to the image slices of the third heartbeat, with the images of the second heartbeat now playing the role of the reference images. As an alternative the images of the 1st heartbeat play the role of the reference images.

Applied to the situation shown in FIG. 3 this could mean that images 51 to 54 are acquired as shown in FIG. 4 or only image 51 and in the second heartbeat image 41 shown in FIG. 3 would be determined so that steps a) to d) can be carried out before the different short axis views 42, 43 or 44 are acquired as symbolized in FIG. 3.

In a further step, after steps a) to d) in the third step it is possible in a fourth step to reconstruct full resolution versions of all images across the different slices and heartbeats at the end of the whole acquisition cycle. The postponing of the final diagnostic image reconstruction can be helpful as the full resolution reconstruction and the matching which is needed before image 62 is acquired might be too time-consuming in real time.

The motion is estimated perpendicular to the 2D image slice from an image of the heart itself and not from a diaphragmatic surrogate, the through-plane motion can be determined more accurately than it is possible with a 1D navigator. No additional data acquisition is required as the basis for the navigation is a preceding, fully diagnostic acquisition. This additionally avoids the potential interference of navigator restore pulses on the actual perfusion acquisition and does not involve a learned or an a-priori assumption on the relationship between diaphragmatic and cardiac motion.

FIG. 5 summarizes some of the steps explained above. In a first step S81 a first set of 2D reference images of the heart is acquired and reconstructed as shown by images 51 to 54 wherein at least the first reference image 51 is provided. In step S82 the second set is acquired, either images 41 to 44 as shown in FIG. 3 or images 61 to 64 as shown in FIG. 4. This step for the acquisition of the second set comprises a step S83 in which the first image in the second set is acquired along the first reference plane meaning that the first image in the second heartbeat is acquired along the same image plane as the first image in the reference set. In step S84 a first in-plane displacement is determined based on the first reference image and the first image in the second set, accordingly based on images 61 and 51 or a subset of these images. Based on this first in-plane displacement it is possible to determine a shifted plane position for the second image in the second set which is to be acquired perpendicular to the first image in the second set. This is step S85 and in the next step S86 the second image can be acquired and reconstructed along the shifted plane position. All the images in the first set of 2D images and all images in the second set of 2D images are diagnostically relevant images.

Summarizing the invention discussed above provides an effective way to generate images of the heart at the same slice positions which is useful for perfusion based images as one field of application.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for generating MR images of a heart, the method comprising:
   acquiring and reconstructing a first set of 2D reference images of the heart during a reference heartbeat, the first set comprising a first reference image acquired along a first reference plane position through the heart and at least a further reference image acquired at a second reference plane position perpendicular to the first reference plane position, the further reference image representing a defined anatomical region of the heart; and
   acquiring a second set of 2D images of the heart during a second heartbeat, the acquiring the second set including,
     acquiring a first image in the second set, the first image acquired along the first reference plane position,
     determining, based on the first reference image and the first image in the second set, a first in-plane displacement of the heart in an image plane of the first reference plane position,
     determining a shifted plane position for a second image in the second set to be acquired parallel to the second reference plane position of the heart based on the determined first in-plane displacement, and
     acquiring and reconstructing the second image along the shifted plane position, wherein all images of the first set of 2D reference images and all images of the second set of 2D images are diagnostically relevant images.

2. The method of claim 1, wherein the second set comprises N images, wherein for additional images 2 to N in the second set the shifted plane position for each of the additional images is parallel to one another and perpendicular to the first reference plane position, wherein the shifted plane position for each of the additional images is determined based on the first in-plane displacement.

3. A non-transitory computer readable medium comprising program code, that, when executed by a control unit of an MR imaging system causes the MR imaging system to perform the method of claim 2.

4. The method of claim 1, wherein the second image in the second set and the first reference image substantially have a same anatomical position within the heart.

5. The method of claim 4, wherein final versions of each of the images acquired in the first set and the second set have a higher resolution compared to the first image and the first reference image.

6. The method of claim 5, wherein each image in the first set and the second set is acquired with a single shot Gradient-Echo imaging sequence.

7. The method of claim 6, wherein a matching procedure is used to for the first reference image and the first image in which at least a subset of the first reference image is compared to at least a subset of the first image to determine the first in-plane displacement.

8. The method of claim 7, wherein the acquiring the second set of 2D images of the heart during the second heartbeat and all successive steps is repeated for a number of successive heartbeats.

9. The method of claim 1, wherein final versions of each of the images acquired in the first set and the second set have a higher resolution compared to the first image and the first reference image.

10. The method of claim 1, wherein each image in the first set and the second set is acquired with a single shot Gradient-Echo imaging sequence.

11. The method of claim 1, wherein a matching procedure is used for the first reference image and the first image in which at least a subset of the first reference image is compared to at least a subset of the first image to determine the first in-plane displacement.

12. The method of claim 1, wherein the acquiring the second set of 2D images of the heart during the second heartbeat and all successive steps is repeated for a number of successive heartbeats.

13. The method of claim 1, wherein data of the acquired first set of 2D reference images and the acquired second set of 2D images represent inflow of contrast agent into the heart.

14. A non-transitory computer readable medium comprising program code, that, when executed by a control unit of an MR imaging system causes the MR imaging system to perform the method of claim 1.

15. An MR imaging system configured to generate MR images of a heart comprising:
    a control module is configured to cause the MR imaging system to,
        acquire and reconstruct a first set of 2D reference images of the heart during a reference heartbeat, the first set comprising a first reference image acquired along a first reference plane position through the heart and at least a further reference image acquired at a second reference plane position perpendicular to the first reference plane position, the further reference image representing a defined anatomical region of the heart, and
        acquire a second set of 2D images of the heart during a second heartbeat, which includes,
            acquire a first image in the second set acquired along the first reference plane position,
            determine, based on the first reference image and the first image in the second set, a first in-plane displacement of the heart in an image plane of the first reference plane position,
            determine a shifted plane position for a second image in the second set to be acquired parallel to the second reference plane position of the heart based on the determined first in-plane displacement, and
            acquire and reconstruct the second image along the shifted plane position, wherein all images of the first set of 2D reference images and all images of the second set of 2D images are diagnostically relevant images.

\* \* \* \* \*